B. ANDERSON.
SPRING WHEEL.
APPLICATION FILED SEPT. 4, 1912.
1,061,799.
Patented May 13, 1913.
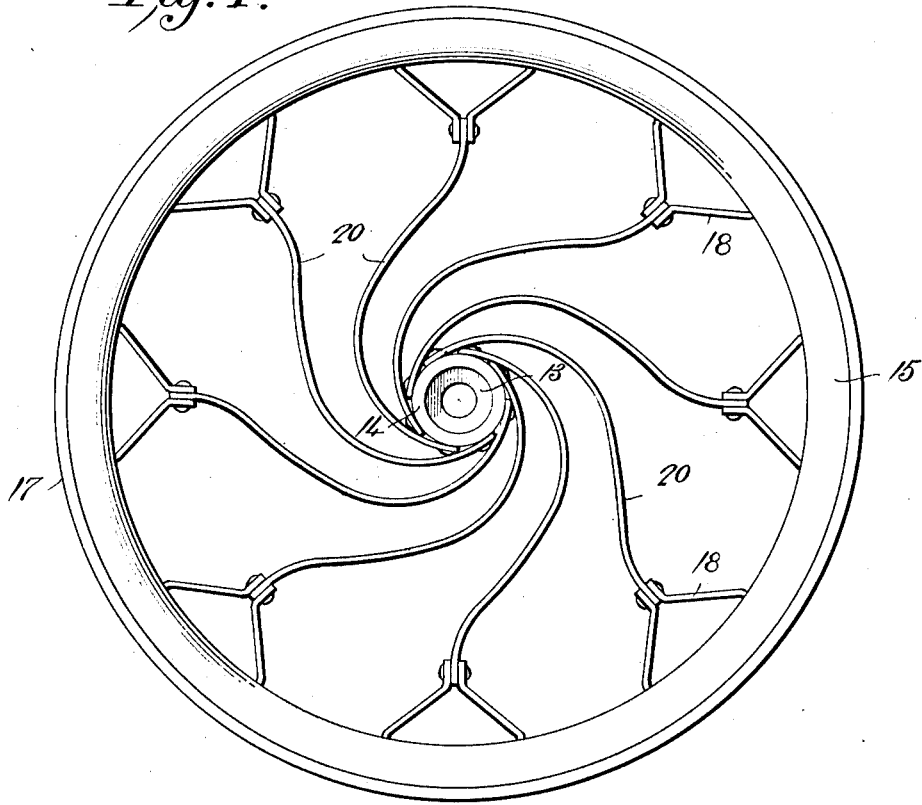
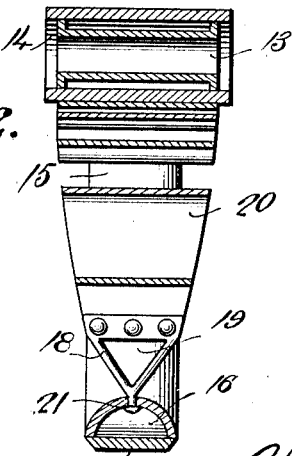
Witnesses
Carroll Bailey
Inventor
B. Anderson,
By Victor J. Evans
Attorney

UNITED STATES PATENT OFFICE.

BENJAMIN ANDERSON, OF GEBO, WYOMING.

SPRING-WHEEL.

1,061,799.  Specification of Letters Patent.  Patented May 13, 1913.

Application filed September 4, 1912.  Serial No. 718,517.

*To all whom it may concern:*

Be it known that I, BENJAMIN ANDERSON, a citizen of the United States, residing at Gebo, in the county of Bighorn and State of Wyoming, have invented new and useful Improvements in Spring-Wheels, of which the following is a specification.

The invention relates to vehicle wheels and more particularly to the class of spring wheels.

The primary object of the invention is the provision of a spring wheel wherein the spokes thereof will respond to shocks and jars incident to the travel of the wheel so as to absorb the same, thereby increasing the life of both the wheel and the vehicle, and at the same time avoiding the necessity of the use of pneumatic or other resilient tires.

Another object of the invention is the provision of a spring wheel in which the spokes, hub and felly are fastened so as to avoid the necessity of the use of screws, thereby assuring maximum strength to the wheel.

A further object of the invention is the provision of a wheel which is simple in construction, possessing the maximum strength, practicability and resiliency, and also which may be manufactured at a minimum cost.

With these and other objects in view the invention consists in the construction, combination and arrangement of parts which will be hereinafter more fully described, illustrated in the accompanying drawing, and pointed out in the claim hereunto appended.

In the drawings:—Figure 1 is a side elevation of a wheel constructed in accordance with the invention. Fig. 2 is a fragmentary vertical transverse sectional view thereof.

Similar reference characters indicate corresponding parts throughout the several views in the drawing.

Referring to the drawing by numerals, the wheel comprises a hub 13 surrounded by a sleeve 14 which is made fast thereon in any desirable manner, and concentrically disposed with respect to said sleeve 14 is a felly 15 which is convexed inwardly throughout its circumference to provide an outside channel 16, and has fitted thereon a flat tire 17, as shown.

Fixed to the felly 15 at intervals thereof are pairs of inwardly converging substantially triangular shaped plates 18, each having an open center 19, the wider ends of these plates being riveted or otherwise secured to the outer ends of curved resilient spokes 20, the inner ends thereof being riveted or otherwise secured to the outer periphery of the sleeve 14, and thereby centrally mounting the hub with respect to the felly.

Each plate 18 is formed at its smaller end with a rivet extension 21 which is made fast in the felly.

A wheel constructed in the foregoing manner will possess the required resiliency to absorb all shocks and jars incident to its travel, and also will possess the required strength to withstand hard usage.

What is claimed is:—

A spring wheel comprising a hub, a felly disposed concentrically with respect to said hub and being of semicircular shape in cross section throughout its circumference, resilient spokes fixed to said hub, triangular shaped plates fixed to opposite sides of the outer ends of the spokes and outwardly diverging therefrom, rivet extensions formed integrally with the plates and engaged in the felly, and an annular tread bridging the concaved portion of the felly and securely mounted on the same.

In testimony whereof I affix my signature in presence of two witnesses.

BENJAMIN ANDERSON.

Witnesses:
W. G. JOHNSTON,
R. G. CULBERTSON.

---

Copies of this patent may be obtained for five cents each, by addressing the "Commissioner of Patents, Washington, D. C."